Figure 2:
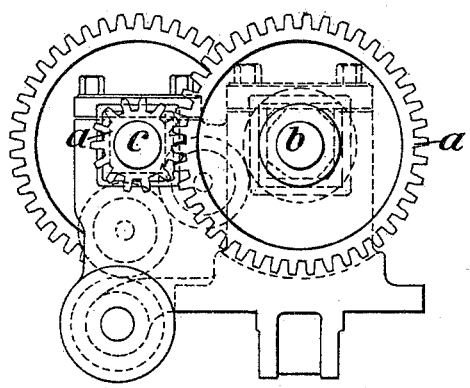

(No Model.) 9 Sheets—Sheet 1.

W. BUCKLEY.
LATHE.

No. 457,070. Patented Aug. 4, 1891.

Witnesses,
Bristow Hunt,
John Thomas Pagan.

Inventor
William Buckley (No Model.) 9 Sheets—Sheet 2.

W. BUCKLEY.
LATHE.

No. 457,070. Patented Aug. 4, 1891.

Witnesses,
Bristow Hunt
John Thomas Pagan.

Inventor,
William Buckley (No Model.) 9 Sheets—Sheet 3.

W. BUCKLEY.
LATHE.

No. 457,070. Patented Aug. 4, 1891.

Witnesses,
Bristow Hunt
John Thomas Pagan

Inventor.
William Buckley (No Model.) 9 Sheets—Sheet 4.
W. BUCKLEY.
LATHE.

No. 457,070. Patented Aug. 4, 1891.

Witnesses,
Bristow Hunt
John Thomas Pagan

Inventor,
William Buckley (No Model.)  9 Sheets—Sheet 5.

W. BUCKLEY.
LATHE.

No. 457,070.  Patented Aug. 4, 1891.

Witnesses,
Bristow Hunt
John Thomas Pagan.

Inventor
William Buckley (No Model.) 9 Sheets—Sheet 6.
W. BUCKLEY.
LATHE.
No. 457,070. Patented Aug. 4, 1891.
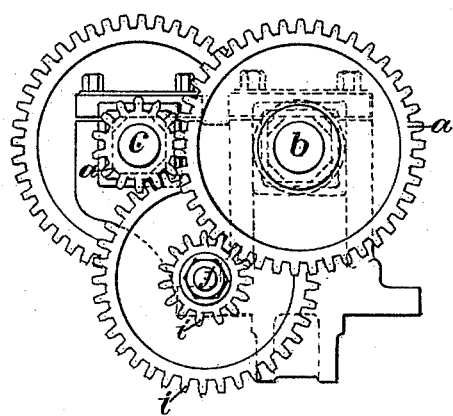
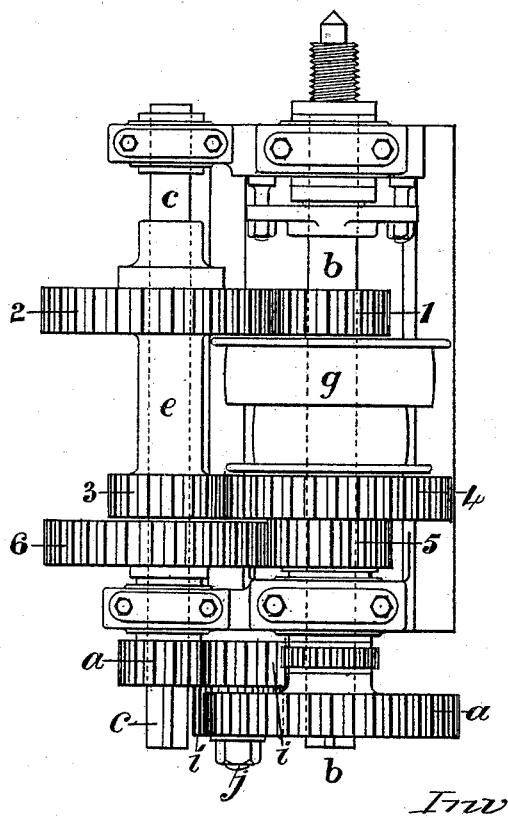

(No Model.) 9 Sheets—Sheet 7.

W. BUCKLEY.
LATHE.

No. 457,070. Patented Aug. 4, 1891.

Witnesses,
Bristow Hunt.
John Thomas Pagan.

Inventor,
William Buckley.

(No Model.) 9 Sheets—Sheet 8.

W. BUCKLEY.
LATHE.

No. 457,070. Patented Aug. 4, 1891.

Witnesses,
Bristow Hunt
John Thomas Pagan.

Inventor,
William Buckley, (No Model.)   9 Sheets—Sheet 9.

W. BUCKLEY.
LATHE.

No. 457,070.   Patented Aug. 4, 1891.

Witnesses,
Bristow Hunt.
John Thomas Pagan.

Inventor.
William Buckley.

UNITED STATES PATENT OFFICE.

WILLIAM BUCKLEY, OF SHEFFIELD, ENGLAND.

LATHE.

SPECIFICATION forming part of Letters Patent No. 457,070, dated August 4, 1891.

Application filed March 28, 1890. Serial No. 345,666. (No model.) Patented in England May 23, 1889, No. 8,550; in France August 16, 1889, No. 200,233, and in Belgium September 18, 1889, No. 87,774.

*To all whom it may concern:*

Be it known that I, WILLIAM BUCKLEY, engineer, a subject of the Queen of Great Britain, residing at Sheffield, in the county of York, in England, have invented new and useful Improvements in Sliding, Surfacing, Screw-Cutting, or other Similar Lathes, (patented in Great Britain May 23, 1889, No. 8,550; in France August 16, 1889, No. 200,233, and in Belgium September 18, 1889, No. 87,774;) and I do hereby declare that the following is a full, clear, and exact description thereof.

My invention relates to and consists in new and useful improvements in the construction of lathes, the principal object of my invention being to regulate the speed of the main spindle and the purchase of lathes to be used for turning articles and for cutting screws of different diameters in the most efficient and economical way, which object I accomplish as follows:

In carrying out my invention in practice, according to one modification, I extend the end of the main spindle and also the end of the counter-spindle of the lathe beyond the back bearings, which support or carry the main and counter spindles. Upon the projecting ends I place change wheels, which can be made to gear into each other or into one or more compound change wheels and pinions, which I place in a suitable position upon one or more studs, and I vary the diameters of the change-wheels or of the compound change wheels and pinions by taking them off the spindles or off the studs and putting on change-wheels of other suitable diameters in the place of them, according to the diameter of the article to be turned or the screw it is required to cut. By these means the speed of the main spindle of the lathe is adjusted, so that the work can be done in the most efficient manner and with great economy, whether the article operated upon be large or small.

According to another modification of my improvements, in addition to the main spindle and the counter-spindle, I apply and use one or more additional counter-spindles, which can be made to consist of either solid bars or hollow shafts or tubes, and it or they can be arranged either separately or one within the other, the hollow shaft or tube forming an outer counter-spindle to convey motion through the bearings, which support it or them independently of the inner counter-spindle, and which I fix in any convenient position in the lathe, either parallel to or at an angle with the main spindle for gearing with the first counter-spindle placed at either side of the lathe, and I extend the ends of these counter-spindles beyond either their back or their front bearings, and I put change-wheels upon the projecting ends or upon those parts of the counter-spindles within and between the bearings. The change-wheels can be arranged to gear into each other or into one or more compound change wheels and pinions placed upon one or more studs, and I vary the diameters of the change-wheels or of the compound change wheels and pinions by taking them off the counter-spindles or off the studs and putting on change-wheels of other suitable diameters in the place of them, according to the diameter of the article to be turned or the screw to be cut, as described in the previous modification.

According to a further modification of my improvements I apply and use a loose barrel or sleeve which can be made in two or more parts. I put this loose barrel or sleeve upon the counter-spindle or upon the main spindle, as may be required—that is to say, when the cone-pulley is upon the main spindle I put the loose barrel or sleeve upon the counter-spindle, but when the cone-pulley is upon the counter-spindle I put the loose barrel or sleeve upon the main spindle. One part of the loose barrel or sleeve is connected to the spindle by means of one or more keys or studs fitted into one or more grooves or recesses in the loose barrel or sleeve and in the spindle, or by any other desirable means, the different parts of the loose barrel or sleeve being connected together by bolts and flanges, or in any suitable or practicable way, and by connecting or disconnecting the parts of the loose barrel or sleeve the lathe can be driven either from wheels upon the extended ends of the spindles or from the wheels placed within or between their bearings.

I wish it to be clearly understood that the change-wheels alluded to in the foregoing descriptions can be either cog-wheels with teeth of any desired form, such as parallel, circular, helical, or bevel, or they can be friction-wheels, the frictional surfaces of which can be either parallel, curved, angular, or of any other section.

In order that my invention may be fully understood, it is illustrated on the accompanying ten sheets of drawings, in describing which the letters used and marked thereon and the numerals are the same for corresponding parts in all the figures.

$a$ indicates the change-wheels; $b$, the main spindle; $c$, the counter-spindle; $d$, the second counter-spindle; $e$, the loose barrel or sleeve; $f$, the coupling-flanges; $g$, the (step) cone-pulley; $h$, the worm and worm-wheel; $i$, the intermediate compound change wheels and pinions, and $j$ the stud-bearing.

Figure 17:
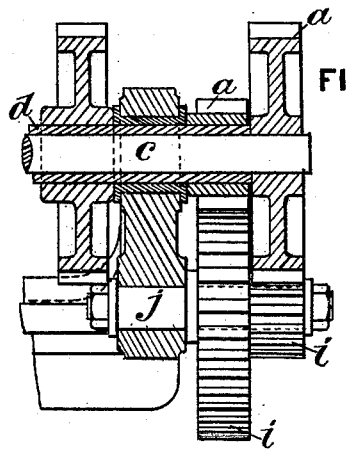
Figure 18:
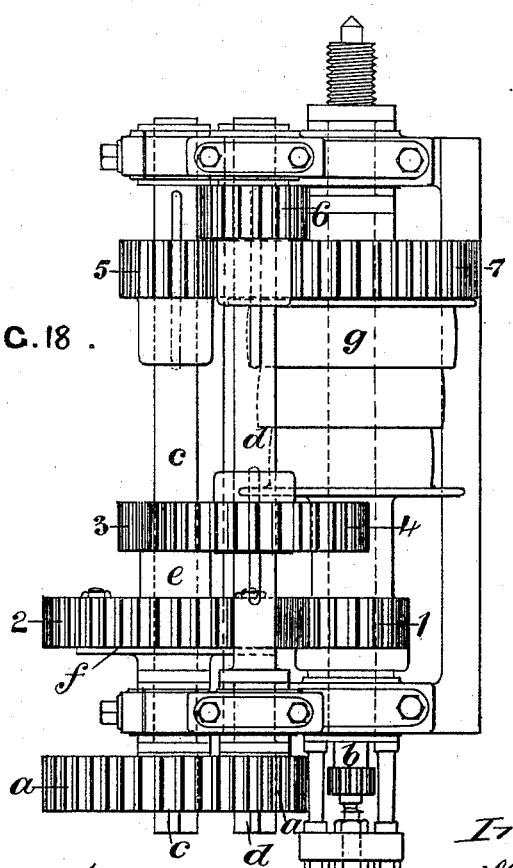

$c'$ is the solid bar, and $d'$ the hollow shaft, Figures 17 and 18.

Figure 1:
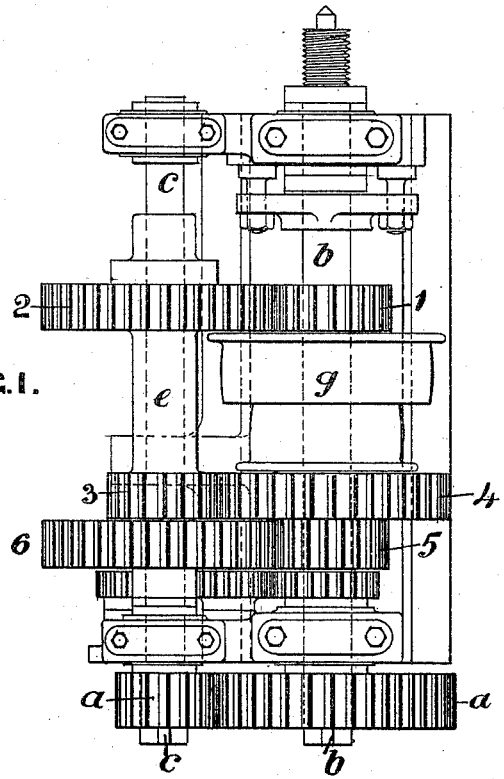

Figs. 1 and 2, Sheet 1, represent and comprise a plan and an end elevation of my improved lathe-head geared with change-wheels $a$, fixed upon the back ends of the main and counter spindles $b$ and $c$.

Figure 4:
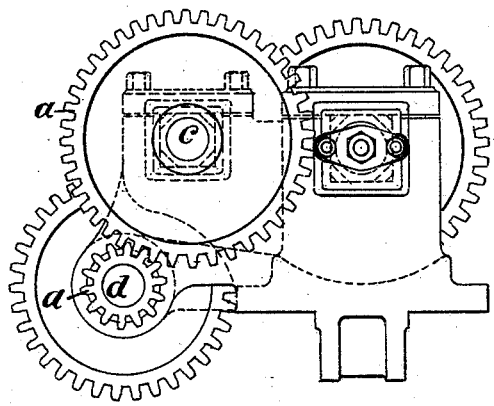
Figure 3:
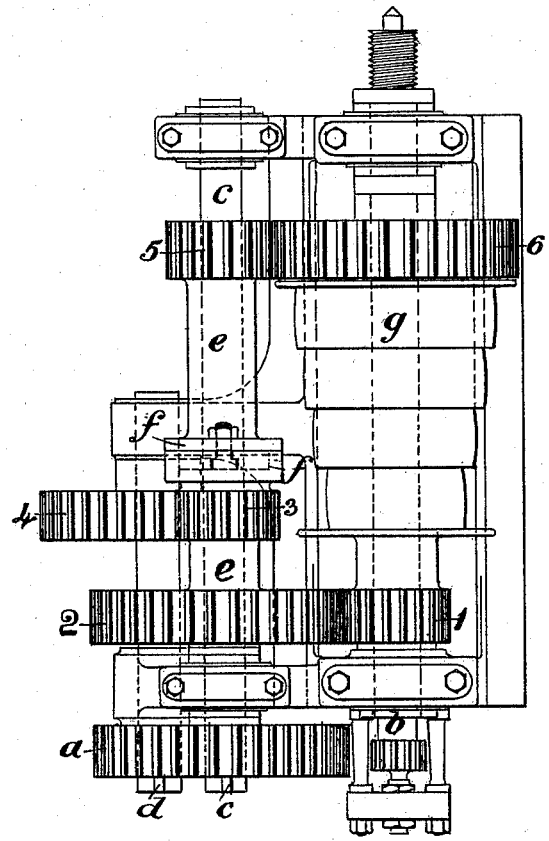

Figs. 3 and 4, Sheet 2, represent and comprise a plan and end elevation of my lathe-head with two counter-spindles $c$ and $d$, and geared with change-wheels $a$, placed upon the back ends of the counter-spindles $c\ d$, and with a loose barrel or sleeve $e$ in two parts, with coupling-flanges $f$.

Figure 6:
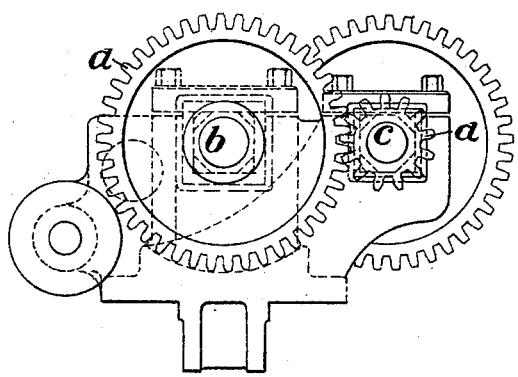
Figure 5:
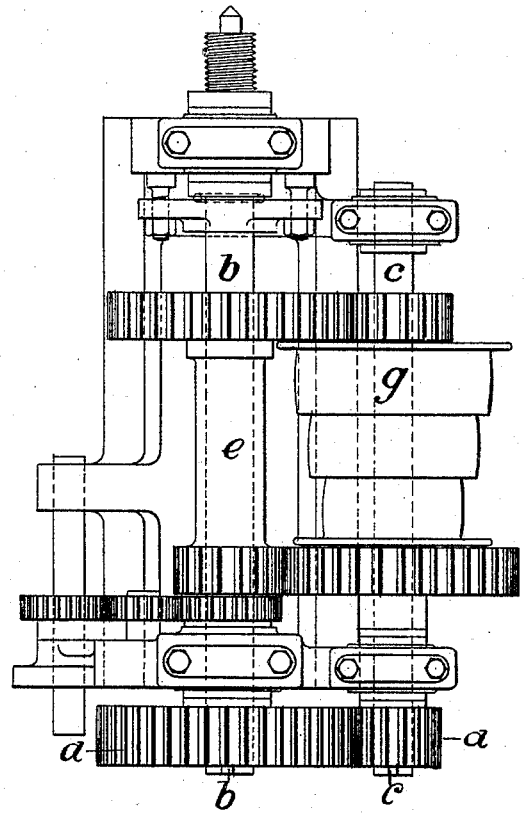

Figs. 5 and 6 represent a plan and end elevation of a lathe-head with a loose barrel or sleeve $e$ on the main spindle $b$, and a step cone-pulley $g$ on the counter-spindle $c$ on the front side of the lathe, geared with change-wheels $a$ on the back ends of the main and counter spindles $b\ c$.

Figure 8:
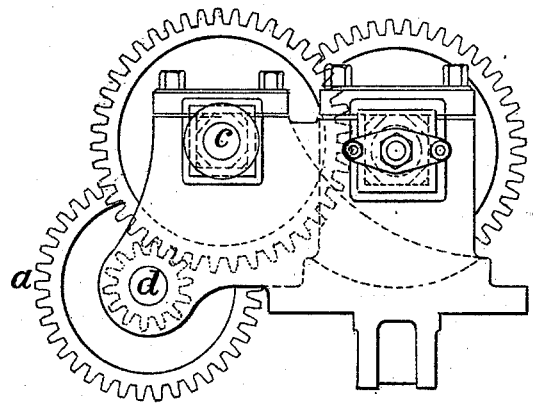
Figure 7:
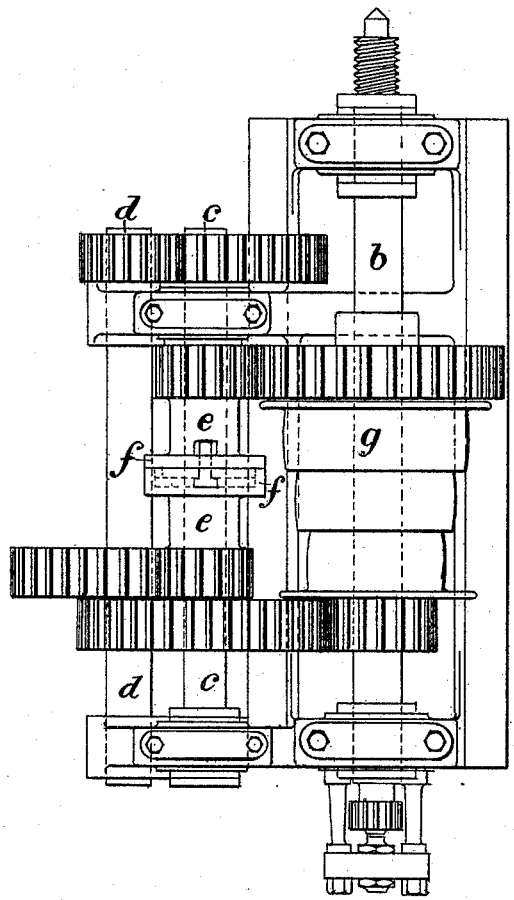
Figure 10:
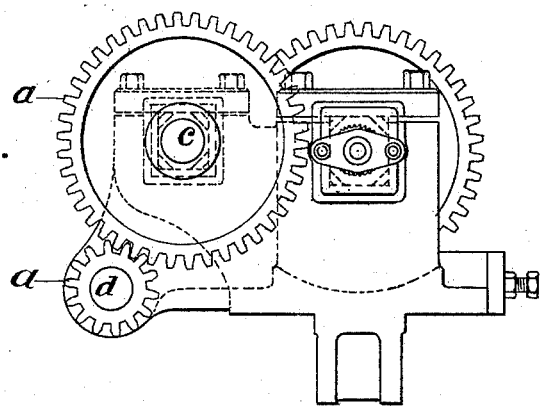
Figure 9:
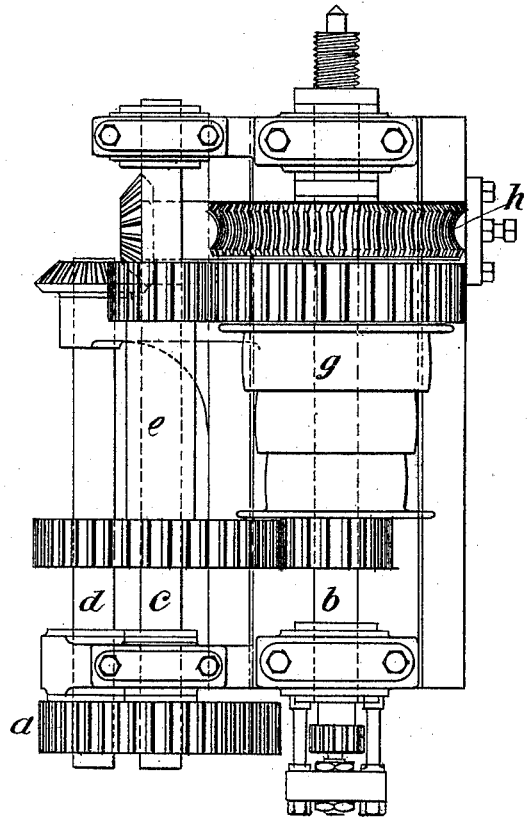

Figs. 7 and 8, Sheet 4, represent a plan and end elevation of a lathe-head with two counter-spindles $c\ d$ and geared with change-wheels $a$, placed upon the front ends of the counter-spindles $c\ d$, and with a loose barrel or sleeve $e$ in two parts, with coupling-flanges $f$.

Figs. 11 and 12, Sheet 6, represent a plan and end elevation of a lathe-head with a worm and worm-wheel $h$, and with two counter-spindles $c\ d$, geared with change-wheels $a$ on the back ends of the counter-spindles $c\ d$.

Figure 14:
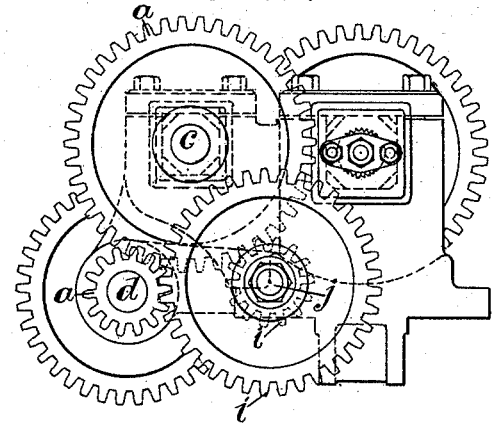
Figure 13:
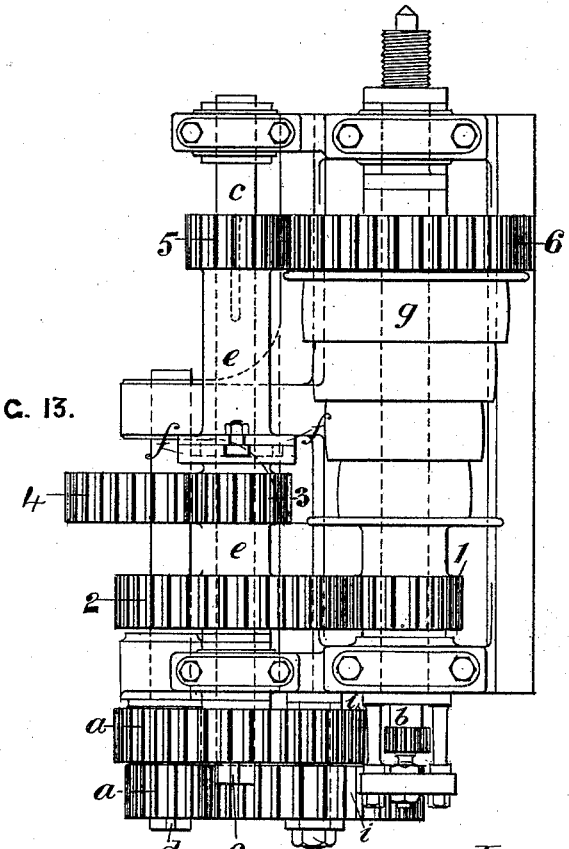

Figs. 13 and 14, Sheet 7, represent a plan and end elevation of a lathe-head geared with change-wheels $a$, placed upon the back ends of the main and counter spindles $b$ and $c$, and intermediate compound change wheel and pinion $i\ i$ on the stud-bearing $j$. The intermediate compound change wheel and pinion $i\ i$ can be removed and the change-wheels $a$ can be made to gear into each other.

Figure 16:
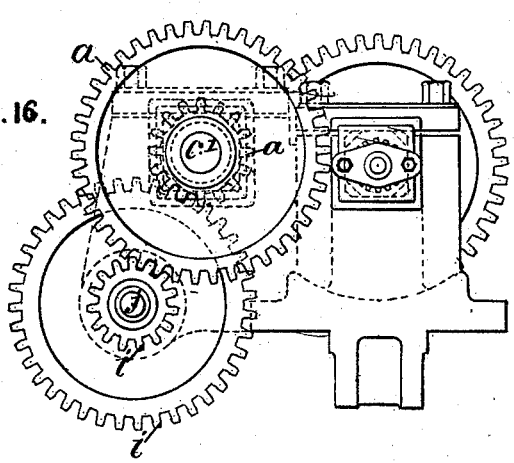
Figure 15:
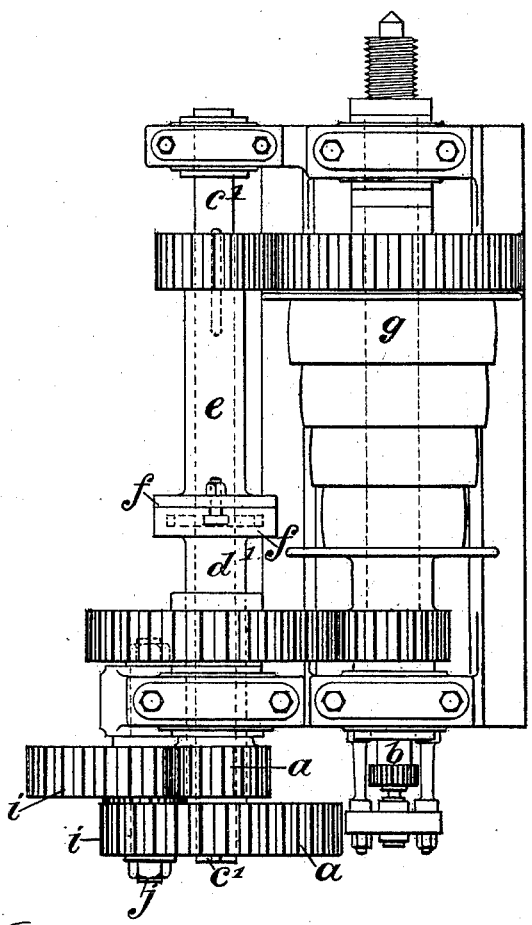

Figs. 15 and 16, Sheet 8, represent a plan and end elevation of a lathe-head with two counter-spindles $c$ and $d$, and geared with change-wheels $a$, placed upon the back ends of the counter-spindles $c\ d$, and intermediate compound change wheel and pinion $i\ i$ on the stud-bearing $j$. The intermediate compound change wheel and pinion $i\ i$ can be removed and the change-wheels $a$ can be made to gear into each other.

Figs. 17 and 18, Sheet 9, represent a plan and end elevation of a lathe-head with two counter-spindles consisting of a solid bar $c'$ and a hollow shaft $d'$, with a coupling-flange $f$, forming the second counter-spindle, arranged one within or through the other and geared with change-wheels $a$, placed upon the back ends of the counter-spindles $c\ d$, and intermediate compound change wheel and pinion $i\ i$ on the stud-bearing $j$, and with a loose barrel or sleeve $e$, with a coupling-flange $f$.

Figure 19:
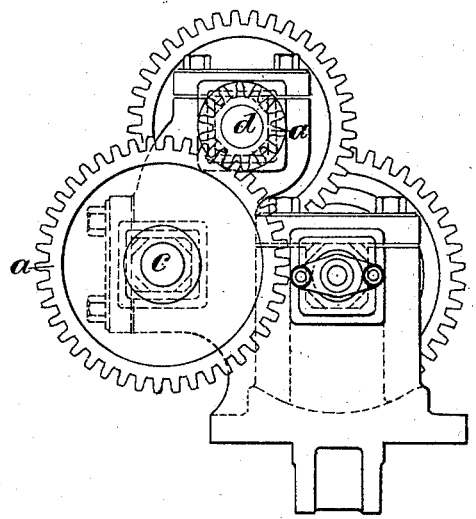

Fig. 19 represents a sectional side elevation of one end of the inner and outer counter-spindles $c\ d$, with the change-wheels $a$ and the intermediate compound change wheel and pinion $i\ i$ on the stud-bearing $j$.

Figs. 20 and 21, Sheet 10, represent a plan and end elevation of the lathe-head with two counter-spindles $c$ and $d$, consisting of solid bars, the second counter-spindle $d$, placed above and between the main spindle $b$ and the counter-spindle $c$ and geared with change-wheels $a$, placed upon the back ends of the counter-spindles $c\ d$, and with a loose barrel or sleeve $e$, with a coupling-flange $f$. The change-wheels $a$ can be employed to vary the speed and purchase of the lathe in connection with wheels 1 and 2, and 6 and 7 with wheels 3 and 4 and 5 out of gear, or with wheels 1 and 2, 3 and 4, and 5 and 7 in gear and wheel 6 out of gear; or the lathe can be driven by the ordinary double-gear arrangement with wheels 1 and 2 and 5 and 7 by coupling wheel 2 with the coupling-flange $f$ and the change-wheels $a$ and wheels 3 and 4 and 6 out of gear.

As illustrating the steps in the transmission of the driving motion in operating my improved lathes, I may here state that, as shown at Fig. 1, Sheet 1, and Fig. 13, Sheet 7, there are three pairs of intermediate wheels, marked 1 and 2, 3 and 4, and 5 and 6, which are used to transmit the driving motion from the cone-pulley $g$ to the change-wheels $a$. Wheel 1, which is attached to the cone-pulley $g$, revolving on the main spindle $b$, gives motion to the loose barrel or sleeve $e$. Wheel 3 gives motion to the wheels 4 and 5, cast or placed together, and which are free to revolve on the main spindle $b$. Wheel 6 is keyed to the counter-spindle $c$, and is driven by the wheel 5. The change-wheels $a$ convey motion from the counter-spindle $c$ to the main spindle $b$. The wheels 2 and 3 will slide out of gear and the cone-pulley $g$ can be attached to the wheels 4 and 5, and the lathe is worked with the wheels 5 and 6 and the change-wheels $a$, and with or without the intermediate compound change wheel and pinion $i\ i$ in gear; and, as seen at Fig. 3, Sheet 2, and Fig. 15, Sheet 8, there are two pairs of wheels, marked 1 and 2 and 3 and 4, which convey motion from the cone-pulley $g$ to the second counter-spindle $d$. The change-wheels $a$ transmit the driving motion from the second counter-spindle $d$ to the first counter-spindle $c$. The wheel 5, driven by the first counter-spindle $c$, gears with the wheel 6 and actuates the main spindle $b$. By connecting the barrel or sleeve $e$ with the coupling-flanges $f$, the lathe can be worked with the ordinary back gear-wheels 1 and 2 and 5 and 6 without the change-wheels $a$ and without the intermediate compound change wheel and pinion $i\ i$ in gear.

Having fully described my invention and in what manner it is to be carried into practical effect, I have to state that my present invention does not apply to those lathes in which purchase is obtained by means of a wheel or pinion gearing, either internally or externally, with a wheel placed upon the back of the face-plate, but to those lathes in which the purchase is obtained and the speed and purchase are regulated and varied by wheels placed within or between the bearings or upon the ends or other parts of the different spindles or studs; and I declare that what I claim, and desire to secure by Letters Patent, is—

1. In a lathe of the character described, the combination of a main spindle, a counter-spindle, bearings for the same, change-wheels $a$, applied to the rear ends of said spindles, a sleeve $e$ having gear-wheels and mounted on one of said spindles, and suitable corresponding gear-wheels on the other spindle, substantially as set forth.

2. In a lathe of the character described, the combination of a main spindle, a counter-spindle, bearings for the same, change-wheels $a$, applied to the rear ends of said spindles, a sleeve $e$, comprising a plurality of parts which may be connected or disconnected and having gear-wheels and mounted on one of said spindles, and suitable corresponding gear-wheels on the other spindle, substantially as set forth.

In witness whereof I have hereunto set my hand in presence of two witnesses.

WILLIAM BUCKLEY.

Witnesses:
BRISTOW HUNT,
JOHN THOMAS PAGAN.